US006586565B2

(12) United States Patent
Palaniappan

(10) Patent No.: US 6,586,565 B2
(45) Date of Patent: Jul. 1, 2003

(54) PROCESS FOR THE PREPARATION OF A POLYANILINE SALT

(75) Inventor: Sirnivasan Palaniappan, Andhra Pradesh (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 09/896,935

(22) Filed: Jun. 29, 2001

(65) Prior Publication Data

US 2002/0062005 A1 May 23, 2002

(30) Foreign Application Priority Data

Nov. 17, 2000 (IN) .................................. 1029/DEL/2000

(51) Int. Cl.[7] ................................................ C08G 73/02

(52) U.S. Cl. ....................... 528/422; 528/210; 525/500; 525/540; 252/500

(58) Field of Search ................................ 528/422, 210; 252/500; 525/540

(56) References Cited

U.S. PATENT DOCUMENTS 5,276,112 A 1/1994 MacDiarmid et al. ...... 525/540
5,403,913 A * 4/1995 MacDiarmid et al. ...... 528/495
5,567,356 A 10/1996 Kinlen ....................... 252/500
5,840,214 A * 11/1998 Kinlen ....................... 252/500
5,863,465 A * 1/1999 Kinlen ....................... 525/540
5,866,043 A * 2/1999 Ikkala et al. ................ 252/500

FOREIGN PATENT DOCUMENTS

EP 0362378 4/1990
EP 0579027 1/1994
WO 9322775 11/1993
WO WO 98/05041 * 5/1998

* cited by examiner

*Primary Examiner*—P. Hampton-Hightower
(74) *Attorney, Agent, or Firm*—Ladas & Parry

(57) ABSTRACT

The present invention provides a process for the preparation of a polyaniline salt by polymerizing an aromatic amine in the presence of a protonic acid and a mixture of aqueous and hydrocarbon solvents to obtain polyaniline salt dissolved in organic phase or in powder form.

17 Claims, No Drawings

PROCESS FOR THE PREPARATION OF A POLYANILINE SALT

FIELD OF THE INVENTION

The present invention relates to a process for the preparation of a polyaniline salt. The present invention particularly relates to a process for preparation of a polyaniline salt using protonic acid such as hydrochloric, sulfuric, nitric, phosphoric and 5-sulfosalicylic acid. The present invention more particularly relates to an emulsion polymerization process for preparing an electrically conductive polyaniline salt wherein the polyaniline salt is in organic carrier solvent and the solution is optically transparent.

BACKGROUND OF THE INVENTION

A lot of research work in the area of electrically conductive polymers is being carried out at the moment all over the world. These polymers make it possible to replace metallic conductors and semi-conductors in many applications such as batteries, transducers, switches, solar cells, circuit boards, heating elements and in electrostatic discharge (ESD) and electromagnetic interference shielding (EMI) applications. The advantages of electrically conductive polymers compared to metals are, for instance, their low weight, good mechanical properties, corrosion resistance and cheaper synthesis and processing methods.

Exemplifying kinds of inherently electrically conductive polymers are polyacetylene, poly-p-phenylene, polypyrrole, polythiophene and polyaniline. An advantage with the inherently electrically conductive polymers is that their electrical conductivity is easily varied as a function of the doping time, which is especially seen in the case of low conductivities. It is difficult to obtain low conductivities for filled electrically conductive plastics.

Polyaniline has emerged as one of the promising conducting polymers and can be used in a variety of applications, such as paint, antistatic protection, electromagnetic protection, electro-optic devices such as liquid crystal devices (LCDs) and photocells, transducers, circuit boards, etc. However, processing of polyaniline into useful products or devices as described above has been problematic because of its insolubility in common solvents.

Synthesis of polyaniline is commonly performed by the method of chemical oxidative polymerization based upon the aqueous solution polymerization system. (see Cao et al., *Polymer* 30:2305, 1989). Typically polyaniline is produced as solid emeraldine salt from chemical oxidative polymerization in the presence of protonic acid such as HCl and $H_2SO_4$. The polyaniline obtained in such way is normally insoluble, which hinders the application of the polyaniline.

Smith et al., U.S. Pat. No. 5,470,505, disclosed that the emeraldine salt prepared by standard methods of oxidative polymerization of aniline monomer in the presence of a protonic acid can be dissolved in an acid, particularly strong acid such as concentrated $H_2SO_4$ $CH_3SO_3H$, $CISO_3H$, $CF_3SO_3H$ and $HNO_3$ (70% or fuming). The emeraldine salt (polyaniline) dissolved in one of these acid solutions is then processed into desired articles in the applications.

Abe et al., U.S. Pat. No. 5,728,321, disclosed a solution of polyaniline (dissolved in an aprotic polar solvent, such as N-methyl-2-pyrolidone) in doped state can be obtained by a method using a specific protonic acid, such as hydrofluoroboric acid, perchloric acid, or any other organic acids having acid dissociation constant pKa values of less than 4.8, as dopants in the oxidative polymerization of aniline monomer Also, the polyaniline obtained according to the above method, which is insoluble in an organic solvent, can be dissolved in an aprotic polar solvent in an undoped state. The undoping of doped polyaniline in order to permit the polyaniline to be soluble in organic solvent is burdensome and increases the production cost.

Traditional methods of preparation of polyaniline in a processable form, including the prior arts mentioned above, have to go through the processes of recovering, filtering, washing, and drying of the reaction product to obtain the solid polyaniline due to the insolubility of the polyaniline formed in the reaction mixture, and need additional processes, such as transforming the emeraldine salt into emeraldine base and dissolving the solid polyaniline or emeraldine base in a solvent, to obtain the desired solution of polyaniline.

To improve the processability, emulsion polymerization processes for preparing a polyaniline salt of a protonic acid have been reported (Cao et al. U.S. Pat. No, 5,232,631, Example 6B, 1993; Cao and Jan-Erik, WO94/03528, 1994 I; Cao and Jan-Erik, U.S. Pat. No. 5,324,453, 1994 II; see also, Osterholm et al. P. Synthetic Metals 55:1034–9, 1993). In these disclosures aniline, a protonic acid, and an oxidant were combined with a mixture of polar liquid, typically water and a non-polar or weakly polar liquid, e.g. xylene, chloroform, toluene, decahydronaphthalene and 1,2,4-tricholorobenzene, all of which are either sparingly soluble or insoluble in water.

Smith et al (*Polymer* 35, 2902, (1994)) reported the polymerization of aniline in an emulsion of water and a non-polar or weakly polar organic solvent. This polymerization was carried out in the present of functionalized protonic acid such ad dodecylbenzenesulfonic acid which simultaneously acted as a surfactant and protonating agent for the resulting polyaniline. This polyaniline produced thereby has good solubility in non-polar solvents.

Protonic acid primary dopants are described as acting as surfactants in that they are purportedly compatible with organic solvents and enable intimate mixing of the polyaniline in bulk polymers (Cao et al, *Synthetic Metals* 48:91–97, 1992; Cao et al U.S. Pat. No. 5,232,631, 1993; which are incorporated by reference). Thus, any surfactant aspect of the primary dopants was thought to contribute to the processability rather than the conductivity of the polyaniline.

Heeger's group (*Synthetic Metals* 48, 91, (1992)); (*Synthetic Metals* 3514 (1993)) reported that emeraldine base doped with a functionalized protonic acid, for example, camphorsulfonic acid and dodecylbenzenesulfonic acid, can be dissolved in a non-polar or moderate polar organic solvent. This three component system has good solubility in common organic solvents and is compatible with many of the classical polymers.

Polyaniline salt has been categorized as an interactable material that is neither soluble nor fusible under normal conditions. Several strategies were worked out to introduce solubility and processability in polyaniline.

They are:

Dedoping of polyaniline salt to polyaniline base. Dissolving polyaniline base in aprotic solvent and redoping to polyaniline salt. However, this procedure is burdensome and increases the production cost.

Dissolving the polyaniline salt in concentrated acid. However, they are highly corrosive because of the use of concentrated acid.

Preparation of substituted polyaniline; preparation of polyaniline copolymers that are not homopolymers of polyaniline salt The conductivity of the substitute polyaniline and copolymer may be much lower than that of the polyaniline.

Preparing of polyaniline salt using functionalized protonic acids both by aqueous and emulsion polymerization process—functionalized protonic acid is costly.

As can be seen, it is important to develop processes for the preparation of polyaniline salt that is economical and provides good yield.

OBJECTS OF THE INVENTION

The main object of the present invention is to provide a process for the preparation of a polyaniline salt economically and in good yield.

It is another object of the invention to provide a process for the preparation of a polyaniline salt wherein the electrically conductive polyaniline salt is in organic carrier solvent.

Another object of the present invention is to provide a process for the preparation of polyaniline salts using cheaper protonic acids such as hydrochloric, sulfuric, nitric, phosphoric and 5-sulfosalicylic acid protonic acid.

Yet another object of the present invention is to provide a process for the preparation of an electrically conductive polyaniline salt in powder form.

SUMMARY OF THE INVENTION

The present method involves a process for the polymerization of aniline into polyaniline salts using cheaper protonic acids such as hydrochloric, sulfuric, nitric, phosphoric and 5-sulfosalicylic acid wherein the polyaniline salt is in carrier organic solvent such as chloroform, dichloromethane, toluene and the solution is optically transparent. This solution can be used directly for blending with other insulating polymers using conventional methods.

Polyaniline salts in organic carrier solvent were prepared directly in one step by polymerizing aniline with cheaper organic and inorganic acids. In addition to polyaniline sulfate salt, using this process, other polyaniline salts may be prepared using other acids such as hydrochloric, nitric, phosphoric and 5-sulfosalicylic acid. Polyaniline-salt with higher conductivity (0.1 S/cm) can be prepared when compared with that of polyaniline-sulfate salt (0.01 S/cm).

The following drawbacks of the prior art do not occur in the process of the invention.

(i) use of costlier functionalized protonic acid (ii) use of concentrated acid for dissolving the polyaniline salt resulting in corrosion and handling problems, and (iii) converting polyaniline salt into polyaniline base, dissolving the polyaniline base in solvents then adding insulating polymer and converting into electrically conducting polyaniline blend.

Accordingly the present invention relates to a process for the preparation of a polyaniline salt which comprises polymerizing an aromatic amine in the presence of a protonic acid and a mixture of aqueous and hydrocarbon solvents, separating the polyaniline slat in solution form from the reaction mixture.

In one embodiment of the invention, the polymerisation is carried out in the presence of an ionic surfactant and a radical initiator at ambient temperature for at least 24 hours In another embodiment of the invention, if desired a non-solvent is added to the above polyaniline salt solution to precipitate salt and the polyaniline salt precipitated is separated by known methods.

The present invention is directed to a process for the preparation of an electrically conductive polyaniline salt in non-aqueous organic carrier solvent.

The present invention is also directed to a process for the preparation of an electrically conductive polyaniline-salt in the powder form.

In another embodiment of the invention, the protonic acid used is selected from the group comprising of hydrochloric acid, sulfuric acid, phosphoric acid, nitric acid 5-sulfosalicylic acid and any mixture thereof.

In a further embodiment of the present invention, the aromatic amine used comprises aniline or substituted aniline selected from 2-methyl aniline and 3-methyl aniline.

In another embodiment of the invention, the hydrocarbon solvent used comprises a chlorinated solvent selected from the group consisting of chloroform, dichloromethane, and an aromatic hydrocarbon such as toluene.

In yet another embodiment of the invention, the ionic surfactant used is selected from the group consisting of an anionic surfactant selected from sodium lauryl sulfate and dioctyl sodium sulfosuccinate, and a cationic surfactant such as cetyltrimethylammonium bromide.

In still another embodiment of the invention, the radical initiator used comprises benzoyl peroxide.

In a feature of the present invention, the separation of polyaniline sulfate in organic solvent is effected by pouring the reaction mixture into water.

In another embodiment of the invention, the non-solvent used to precipitate the polyaniline salt out of the organic phase comprises acetone In another embodiment of the invention, the separation of the polyaniline sulfate salt from the reaction mixture is carried out by filtration.

These embodiments will be apparent from the ensuing detailed description of the present invention.

DETAILED DESCRIPTION OF THE INVENTION

The following examples are given by way of illustration and therefore should not be construed to limit the scope of the present invention.

EXAMPLE-1

The following example illustrates the preparation of the polyaniline-5-sulfosalicylic acid salt in weakly polar organic solution by the emulsion-polymerization pathway using sodium lauryl sulfate anionic surfactant.

A solution containing 1.44 g of sodium lauryl sulfate, dissolved in 40 ml of distilled water is mixed with a solution containing 5.85 g benzoyl peroxide in 60 ml chloroform. The milky white emulsion thus foamed is mechanically stirred at 25° C. 2.3 ml aniline and 5-sulfosalicylic acid (5.1 g) in 100 ml of water, is added drop wise to the mixture over a period of approximately 20 minutes. The reaction is allowed to proceed for 24 hours (reaction time was varied as 12, 16, 24 hrs). The color of the emulsion at this time becomes green. The bottom oily green phase containing the polyaniline and an upper aqueous phase were separated. The upper aqueous phase was removed with a separating funnel and 1500 ml water was added to the green phase. The aqueous phase is removed and the green polyaniline phase was subsequently washed with three 1500 ml portions of water. Sodium sulfate (5 g) was added to the polyaniline phase and filtered through filter paper. The polyaniline phase thus obtained appeared uniform to the naked eye and the polymer remained solubilized in the organic phase.

EXAMPLE-2

The following example illustrates the preparation of the polyaniline salts in weakly polar organic solution by the emulsion polymerization pathway using sodium lauryl sulfate anionic surfactant.

A solution containing 1.44 g of sodium lauryl sulfate dissolved in 40 ml of distilled water was mixed with a solution containing 5.85 g benzoyl peroxide in 60 ml chloroform. The milky-white emulsion thus formed was mechanically stirred at 25° C. 2.3 ml aniline and acid (hydrochloric acid 17.5 ml; sulfuric acid 9.0 ml; phosphoric acid 5.5 ml, nitric acid 12.6 ml and 5-sulfosalicylic acid 5.1 g) in 100 ml of water was added drop wise to the mixture over a period of approximately 20 minutes. The reaction was allowed to proceed for 24 hours. The color of the emulsion at this time became green. The bottom oily green phase containing the polyaniline and an upper aqueous phase were separated. The upper aqueous phase was removed with a separating funnel and 1500 ml water was added to the green phase. The aqueous phase was removed and the green polyaniline phase was subsequently washed with three 1500 ml portions of water. Sodium sulfate (5 g) was added to the polyaniline phase and filtered through filter paper. The polyaniline phase thus obtained appeared uniform to the naked eye and the polymer remained solubilized in organic phase.

The isolated polyaniline-salt samples are analyzed by electronic absorption spectral technique using Hitachi U 2000 spectrophotometer Polyaniline sulfate salt in organic solvent according to Example 1 was recorded. Three peaks were observed at around 360–380, 530–540 and 825–850 nm corresponding to polyaniline salt system.

EXAMPLE-3

The following example illustrates the preparation of the polyaniline salt in powder form by the emulsion polymerization pathway.

The organic layer obtained in Examples 1 and 2 containing polyaniline salt in organic solvent was poured into 500 ml of acetone. Polyaniline sulfate salt precipitated out from the organic solvent. The precipitate was then recovered by filtration and the solid washed with 2000 ml of distilled water followed by 250 ml of acetone. The powder was dried at 100° C. till constant mass was reached.

The polyaniline sulfate salts in dry powder form were compressed into pellets using a 16 mm diameter Macro-Micro KBR die and a 12-ton laboratory hydraulic press. The powder was placed in the die and a pressure of 2000 lbs applied thereto. Each pellet thus formed was measured to determine its diameter and thickness. The pellets were in the shape of disks. To measure the conductivity each pellet was coated with silver paint on both the sides having the same cross-sectional area and the resistance measured using an ohmmeter. Lead resistance was 0.03 Ohms for the pellets. Conductivity was calculated using the following formula:

$$\text{Conductivity}-(\text{Thickness})/(\text{resistance.times.area})=d/(RA)$$

The conductivity of the polyaniline 5-sulfosalicylic acid prepared by Example 3 with time periods 16, 24 and 36 hours were found to be 0.4, 0.6 and 0.01 S/cm respectively.

The conductivity of the polyaniline salt prepared by Example 3 with different acids such as hydrochloric, sulfuric, nitric, phosphoric and 5-sulfosalicylic acid were found to be 0.1, 0.1, 0.2, 0.005 and 0.6 S/cm respectively.

Thermal analysis was performed by the simultaneous differential thermal analysis and thermogravimetric analysis technique using the Metler Toledo Star system, and accordingly the samples of Example 3 are evaluated. Polyaniline sulfate samples were found to be stable up to 200° C.

EXAMPLE 4

The following example illustrates the preparation of the polyaniline sulfuric acid salt in weakly polar organic solution by the emulsion-polymerization pathway using dioctyl sodium sulfosuccinate anionic surfactant.

A solution containing 2.0 g of dioctyl sodium sulfosuccinate dissolved in 40 ml of distilled water was mixed with a solution containing 5.85 g benzoyl peroxide in 60 ml chloroform. The milky-white emulsion thus formed was mechanically stirred at 25° C. 2.3 ml aniline and sulfuric acid (6 ml) in 100 ml of water was added drop wise to the mixture over a period of approximately 20 minutes. The reaction was allowed to proceed for 24 hours. The color of the emulsion at this time became green. The bottom oily green phase containing the polyaniline and an upper aqueous phase were separated. The upper aqueous phase was removed with a separating funnel and 1500 ml water was added to the green phase. The aqueous phase was removed and the green polyaniline phase subsequently washed with three 1500 ml portions of water. Sodium sulfate (5 g) was added to the polyaniline phase and filtered through filter paper. The polyaniline phase thus obtained appeared uniform to the naked eye and the polymer remained solubilized in the organic phase.

EXAMPLE 5

The following example illustrates the preparation of the polyaniline sulfuric acid salt in weakly polar organic solution by the emulsion polymerization pathway using cetyltrimethylammonium bromide cationic surfactant.

A solution containing 2.0 g of cetyltrimethylammonium bromide dissolve in 40 ml of distilled water was mixed with a solution containing 5.85 g benzoyl peroxide in 60 ml chloroform. The milky-white emulsion thus formed was mechanically stirred at 25° C. 2.3 ml aniline and sulfuric acid (6 ml) in 100 ml of water, was added drop wise to the mixture over a period of approximately 20 minutes. The reaction was allowed to proceed for 24 hours. The color of the emulsion at this time became green. The bottom oily green phase containing the polyaniline and an upper aqueous, phase were separated. The upper aqueous phase was removed with a separating funnel and 1500 ml water was added to the green phase. The aqueous phase was removed and the green polyaniline phase was subsequently washed with three 1500 ml portions of water. Sodium sulfate (5 g) was added to the polyaniline phase and filtered through filter paper. The polyaniline phase thus obtained appeared uniform to the naked eye and the polymer remained solubilized in the organic phase.

EXAMPLE 6

The following example illustrates the preparation of poly (2-methyl aniline)-sulfuric acid salt in weakly polar organic solution by the emulsion polymerization pathway.

A solution containing 1.44 g of sodium lauryl sulfate dissolved in 40 ml of distilled water was mixed with a solution containing 5.85 g benzoyl peroxide in 60 ml chloroform. The milky-white emulsion thus formed was mechanically stirred at 25° C. 2.7 ml of 2-methyl aniline and sulfuric acid (6 ml) in 100 ml of water was added drop wise to the mixture over a period of approximately 20 minutes.

The reaction was allowed to proceed for 24 hours. The color of the emulsion at this time became green. The bottom oily green phase containing the poly(2-methyl aniline) and an upper aqueous phase were separated. The upper aqueous phase was removed with a separating funnel and 1500 ml water was added to the green phase. The aqueous phase was removed and the green poly(2-methyl aniline) phase was subsequently washed with three 1500 ml portions of water. Sodium sulfate (5 g) was added to the poly(2-methyl aniline) phase and filtered through filter paper. The poly(2-methyl aniline) phase thus obtained appeared uniform to the naked eye and the polymer remained solubilized in the organic phase.

ADVANTAGES OF THE INVENTION

The main advantages of the present invention are:

(i) Preparation of polyaniline salt in organic carrier solvent wherein the polyaniline salt is electrically conductive (ii) Preparation of an electrically conductive polyaniline salt using cheaper protonic acids such as hydrochloric acid, sulfuric acid, nitric acid, phosphoric acid and 5-sulfosalicylic acid.

As various changes could be made in the above methods and compositions without departing from the scope of the invention it is intended that all matter contained in the above description shall be interpreted as illustrative and not limiting.

We claim:

1. A process for the preparation of a polyaniline salt which comprises polymerizing an aromatic amine in the presence of a protonic acid, an ionic surfactant, a radical initiator and a mixture of aqueous and hydrocarbon solvents, and separating the polyaniline salt in solution form from the reaction mixture.

2. A process as claimed in claim 1 wherein the polymerisation of said aromatic amine is performed at ambient temperature and for at least 24 hrs.

3. A process as claimed in claim 1 wherein the protonic acid used is selected from the group consisting of hydrochloric acid, sulfuric acid, nitric acid, phosphoric acid, 5-sulfosalicylic acid and any mixture thereof.

4. A process as claimed in claim 1 wherein the aromatic amine used comprises aniline, or a substituted aniline selected from the group consisting of 2-methyl aniline and 3-methyl aniline.

5. A process as claimed in claim 1 wherein the hydrocarbon solvent used comprises a chlorinated solvent selected from chloroform, dichloromethane or an aromatic hydrocarbon comprising toluene.

6. A process as claimed in claim 1 wherein the ionic surfactant used comprises an anionic surfactant selected from the group consisting of sodium lauryl sulfate and dioctyl sodium sulfosuccinate.

7. A process as claimed in claim 1 wherein the ionic surfactant used comprises a cationic surfactant comprising cetyltrimethylammonium bromide.

8. A process as claimed in claim 1 wherein the radical initiator used is benzoyl peroxide.

9. A process for the preparation of a polyaniline salt which comprises polymerizing an aromatic amine in the presence of a protonic acid, ionic surfactant, a radical initiator and a mixture of aqueous and hydrocarbon solvents, separating the polyaniline salt in solution form from the reaction mixture, adding a non-solvent to the polyaniline salt solution to precipitate the polyaniline salt from solution, and separating the precipitated polyaniline salt from the reaction mixture.

10. A process as claimed in claim 9 wherein the non-solvent used is acetone.

11. A process as claimed in claim 9 wherein the polymerisation of said aromatic amine is performed at ambient temperature and for at least 24 hrs.

12. A process as claimed in claim 9 wherein the protonic acid used is selected from the group consisting of hydrochloric acid, sulfuric acid, nitric acid, phosphoric acid, 5-sulfosalicylic acid and any mixture thereof.

13. A process as claimed in claim 9 wherein the aromatic amine used comprises aniline, or a substituted aniline selected from the group consisting of 2-methyl aniline and 3-methyl aniline.

14. A process as claimed in claim 9 wherein the hydrocarbon solvent used comprises a chlorinated solvent selected from chloroform, dichloromethane or an aromatic hydrocarbon comprising toluene.

15. A process as claimed in claim 9 wherein the ionic surfactant used comprises an anionic surfactant selected from the group consisting of sodium lauryl sulfate and dioctyl sodium sulfosuccinate.

16. A process as claimed in claim 9 wherein the ionic surfactant used comprises a cationic surfactant comprising cetyltrimethylammonium bromide.

17. A process as claimed in claim 9 wherein the radical initiator used is benzoyl peroxide.

* * * * *